Oct. 12, 1926.
E. J. ARMSTRONG
POWER EXCAVATOR
Filed July 30, 1923
1,602,562
2 Sheets-Sheet 2
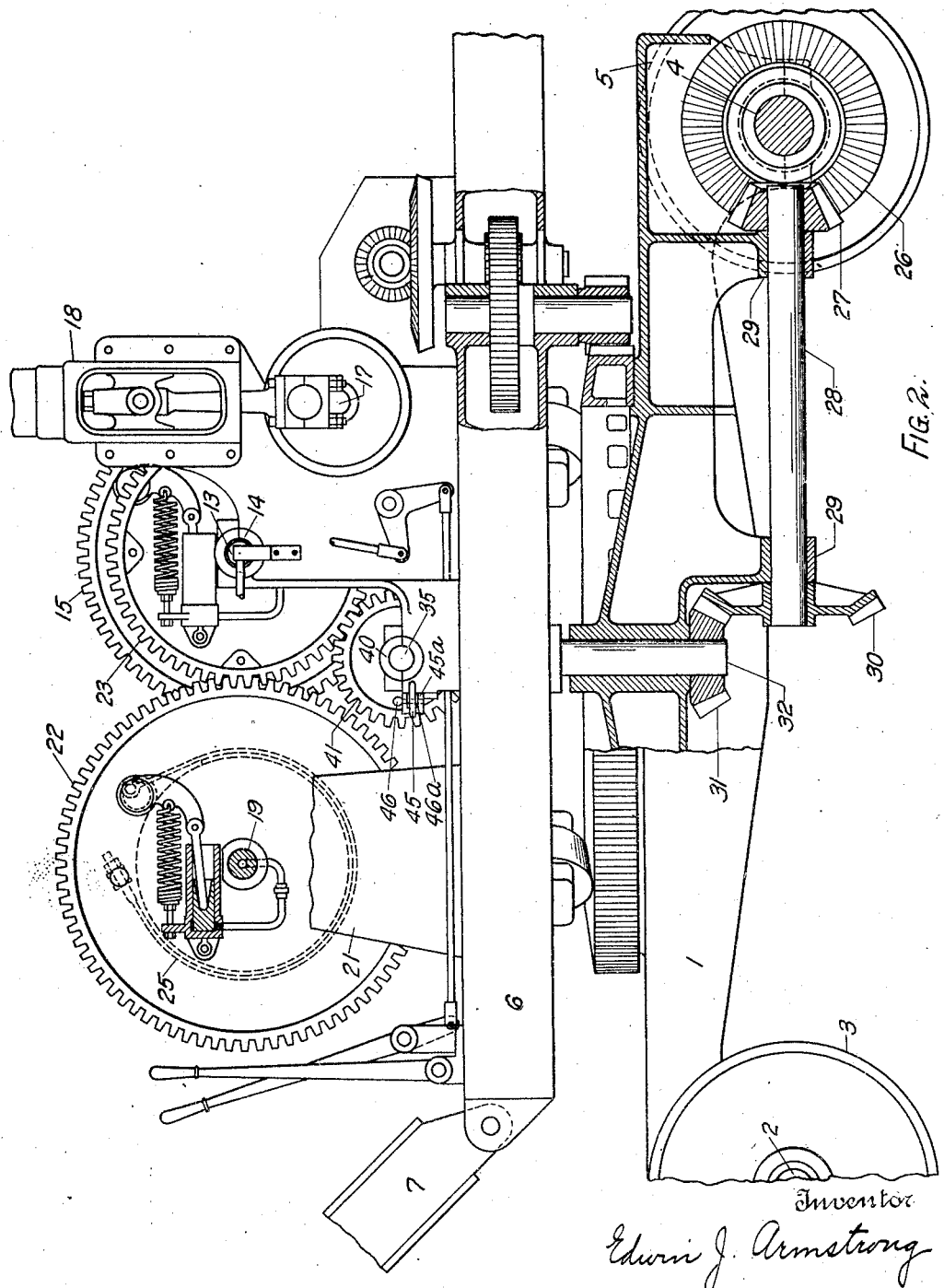

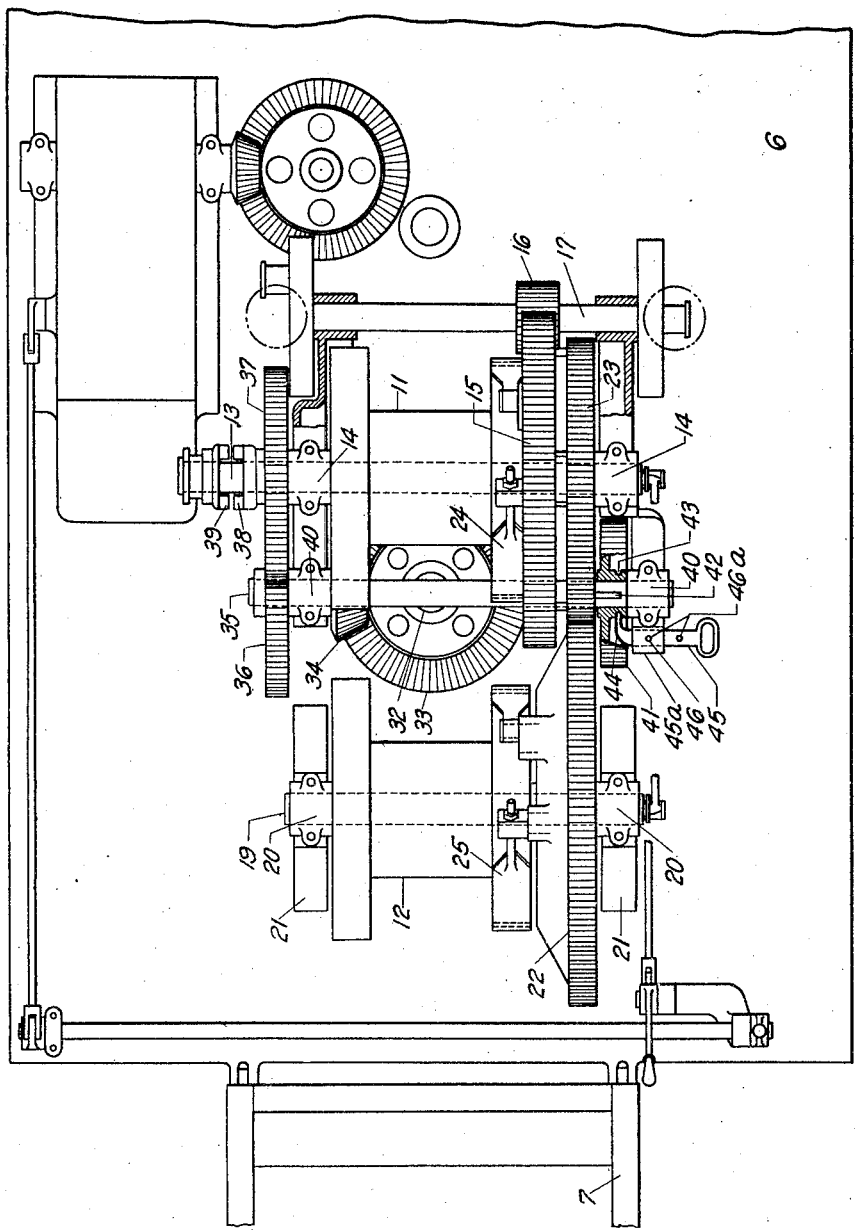

Patented Oct. 12, 1926.

1,602,562

UNITED STATES PATENT OFFICE.

EDWIN J. ARMSTRONG, OF ERIE, PENNSYLVANIA, ASSIGNOR, BY DIRECT AND MESNE ASSIGNMENTS, TO ERIE STEAM SHOVEL COMPANY, OF ERIE, PENNSYLVANIA, A CORPORATION OF PENNSYLVANIA.

POWER EXCAVATOR.

Application filed July 30, 1923. Serial No. 654,600.

This invention is designed to improve excavating machines. Such machines are provided with power platforms where the space is very limited and usually excavating devices are provided with two drums. In order to drive one drum through the same mechanism driving the companion drum it is necessary to have gears on the drum shafts and these gears in order to deliver the proper speed and power are necessarily as large as the drums and to give to the initial drum the power desired in it with the driving mechanism which is practical on machines of this type this gear must be as large as there is space for the gear so that if this gear meshes directly the gear driving the second drum, the second drum does not have under all conditions sufficient power. This condition is corrected in the present invention by supplying a gear concentric with the initial drum gear which with the ordinary clearance of the device permits of a ratio giving to the second drum the power necessary, or desired. The invention further contemplates a convenient two-speed mechanism utilizing the introduced gear driven by the initial drum gear in a two speed driving mechanism for the excavating machine. Other features of the invention will appear from the specification and claims.

The invention is illustrated in the accompanying drawings as follows:—

Fig. 1 a plan view of the machine platform.

Fig. 2 a side elevation of the frame and platform of the machine, a part being in section to better show construction.

1 marks the frame, 2 the steering axle, 3 the steering wheels, 4 the driving axle, 5 drive wheels, 6 the turn table, 7 the boom. These parts are in general of ordinary construction. A hoisting line extends to a main drum 11 and a drag line to an auxiliary drum 12 on the platform. The main drum is loosely mounted on a shaft 13, the shaft being carried by bearings 14 supported from the platform. A main drum gear 15 is fixed on the shaft 13 and is driven from a small gear 16 on a crank shaft 17, the crank shaft being a part of a driving engine 18 also mounted on the platform.

In order to give sufficient power to the main drum the gear 16 is made as small as is practical considering the work that it has to perform and the gear 15 as large as practical for the same reason.

The auxiliary drum 12 is mounted on a shaft 19. The shaft 19 is journaled in bearings 20 on posts 21 extending from the platform. An auxiliary drum gear 22 is mounted on the shaft 19. An intermediate gear 23 is mounted on the shaft 13 and locked with the gear 15. The gear 23 meshes with the gear 22 and thus drives the auxiliary drum. Clutches 24 and 25 are adapted to release and lock the drums with their respective driving gears in the usual manner.

With this structure it is possible to arrange a driving gear on the auxiliary drum of sufficient size with relation to the intermediate gear 23 to give it the desired power from the ordinary driving mechanism and have said gear clear the platform and other parts with the drum in the usual and practical mounting on the machine.

The intermediate gear 23 also affords a convenient mechanism for introducing a two-speed driving mechanism to move the machine from place to place. This mechanism is as follows: A driving gear 26 is fixed on the driving axle and meshes with a beveled gear 27. The beveled gear 27 is fixed on a propeller shaft 28, the propeller shaft being mounted in bearings 29 extending from the frame. A beveled gear 30 is fixed on the propeller shaft and meshes with a beveled gear 31 on the vertical shaft 32. The vertical shaft 32 extends upwardly from the frame and turn table at the axis of the turn table. A beveled gear 33 is fixed on the upper end of the shaft 32. A beveled gear 34 meshes with the beveled gear 33. The gear 34 is fixed on a shaft 35. A spur gear 36 is fixed on the shaft 35 and meshes with a gear 37 journaled on the shaft 13. A detent clutch having the elements 38 and 39 are arranged on the shaft 13 and are adapted to lock the gear 37 with the shaft 13, or to release the same, the clutch operating in the usual manner. It will, therefore, be seen that through the chain of gearing just described when the clutch is thrown in locking the gear 37 with the shaft 13, the shaft 13 being driven from the engine by way of the gears 15 and 16, movement is conveyed to the driving axle. The shaft 35 is journaled in bearings 40 at the sides of the frame. A gear 41 is slidingly mounted on this shaft and locked against rotation by a spline 42. The gear has a groove 43 into which a finger 44 extends. The finger is carried by a bar 45 and the bar is slidingly mounted in a bracket 45ᵃ. The bar has openings 46ᵃ through which a pin 46 may be extended locking the bar with the bracket so as to lock the gear 41 in or out of mesh with the gear 23. The ratio between the gears 41 and 23 differs from the ratio of the gears 37 and 36 and consequently gives to the driving mechanism a different speed. The intermediate gear is of a size permitting of the introduction of the gear 41 between the platform and this gear. Where the gears 15 and 22 are immediately in mesh there is not space for this device in the usual and practical mounting of the drums.

What I claim as new is:—

1. In a power excavator, the combination of a turn table; a frame on which the turn table is mounted; a drum mounted on the turn table; a drum gear mounted concentric with and driving said drum; a driving gear meshing with said drum gear; means on the turn table driving the driving gear; a shaft on which the drum and drum gear are mounted; an auxiliary shaft parallel with the drum shaft; a beveled gear on the auxiliary shaft; a vertical shaft concentric with the axis of the turn table; a beveled gear on the vertical shaft meshing with the first-mentioned beveled gear; a driving axle on the frame; means between the vertical shaft and the driving axle communicating the movement of the vertical shaft to the driving axle; and intermediate gear mounted on the drum shaft and adjacent to the drum gear; a sliding gear on the auxiliary shaft adapted to be thrown into and out of mesh with the intermediate gear, said sliding gear being locked against rotation on the auxiliary shaft; a gear mounted at the opposite side of the frame from the drum gear journaled on the drum shaft; a gear on the auxiliary shaft meshing with the gear journaled on the drum shaft; and a clutch adapted to lock the last-mentioned gear with the drum shaft.

2. In a power excavator, the combination of a turn table; a frame on which the turn table is mounted; a drum mounted on the turn table; a drum gear mounted concentric with and driving said drum; a driving gear meshing with said drum gear; means on the turn table driving the driving gear; a shaft on which the drum and drum gear are mounted; an auxiliary shaft parallel with the drum shaft; a beveled gear on the auxiliary shaft; a vertical shaft concentric with the axis of the turn table; a beveled gear on the vertical shaft meshing with the first-mentioned beveled gear; a driving axle on the frame; means between the vertical shaft and the driving axle communicating the movement of the vertical shaft to the driving axle; an intermediate gear mounted on the drum shaft and adjacent to the drum gear; a sliding gear on the auxiliary shaft adapted to be thrown into and out of mesh with the intermediate gear, said sliding gear being locked against rotation on the auxiliary shaft; a gear mounted at the opposite side of the frame from the drum gear journaled on the drum shaft; a gear on the auxiliary shaft meshing with the gear journaled on the drum shaft; a clutch adapted to lock the last-mentioned gear with the drum shaft; an auxiliary drum on the platform; and a gear mounted concentrically with and driving the last-mentioned drum, said gear meshing with said intermediate gear.

In testimony whereof I have hereunto set my hand.

EDWIN J. ARMSTRONG.